Nov. 12, 1940.    W. S. WOLFRAM    2,221,463
CLUTCH DRIVEN PLATE
Filed Oct. 25, 1938
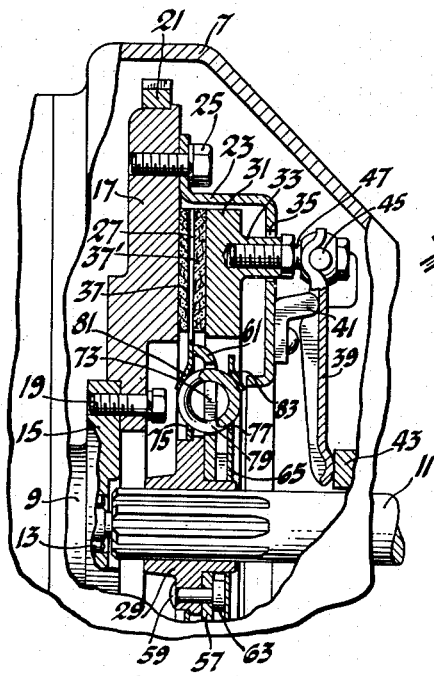
Fig. 1
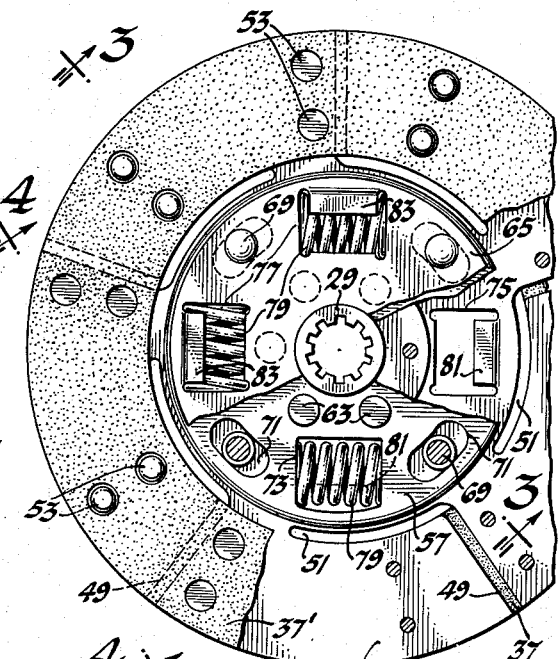
Fig. 2
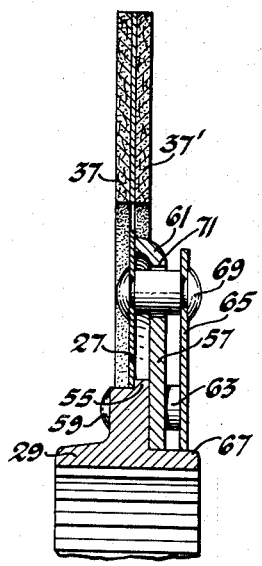
Fig. 3
Fig. 5
Fig. 4
Inventor
William S. Wolfram
By Blackmore, Spencer & Flint
Attorneys Patented Nov. 12, 1940

2,221,463

UNITED STATES PATENT OFFICE 2,221,463

CLUTCH DRIVEN PLATE

William S. Wolfram, Dayton, Ohio, assignor to General Motors Corporation, Detroit, Mich., a corporation of Delaware Application October 25, 1938, Serial No. 236,912

5 Claims. (Cl. 192—68)

This invention relates to friction clutches, such clutches as are used on motor vehicles to couple the engine shaft with the transmission shaft. It will be understood that although the invention was developed for this specific use it is nevertheless useful in many other relations.

An object of the invention is to provide smooth engagement of the driving and driven parts.

A further object is the inclusion of mechanism whereby cushioned torque is provided, associated with a construction to introduce frictional drag to prevent transmission of vibrations.

Other objects include efficiency in operation, simplicity in construction and economy in manufacture.

The invention will be described in connection with the accompanying drawing in which:

Figure 1 is a section radially through the clutch elements, within a clutch housing which is broken away to disclose the novel structure.

Figure 2 is a view in elevation of the driven plate assembly, partly broken away to facilitate the disclosure.

Figure 3 is a section on line 3—3 of Figure 2.

Figure 4 is a view as seen from line 4—4 of Figure 2.

Figure 5 illustrates a detail.

Referring by reference characters to the drawing, numeral 7 is a housing for enclosing the clutch by which the engine shaft 9 is releasably coupled to the transmission shaft 11. Bearings 13 provide a rotatable support for the end of shaft 11 in the terminal flange 15 of the engine shaft. A flywheel 17 is secured to the flange 15 by fastening means 19. The flywheel is equipped with a ring gear 21 whereby the ends may be rotated by the starting motor, not shown. A cover 23 is peripherally secured to the flywheel by bolts 25. Within the cover is a driven plate 27 connected by a torque cushioning construction to be described below with a hub 29 which is slidable but not rotatable on driven shaft 11. Also within the cover is a pressure plate 31. The pressure plate has axial lugs 33 extending through openings 35 in the cover whereby it is axially slidable relative to the flywheel and cover but rotates therewith. Suitable springs, not shown, operate between the cover and pressure plate to move the latter toward the flywheel whereby the driven plate 27 with its facings 37, 37' may be gripped and the rotation of the flywheel transmitted through driven plate 27 to shaft 11. For releasing the clutch against the action of its spring, radial fingers such as 39 are pivoted to the cover at 41. The inner ends of these fingers may be pressed toward the flywheel by conventional throwout mechanism of which only part 43 is illustrated. The outer ends of the fingers engage abutments 45 on the ends of studs 47 projecting from the lugs 33.

The contour of driven plate 27 is shown by Figures 2 and 4. A plurality of symmetrically distributed radial slots 49 extend inwardly from the periphery. These slots terminate in circumferential slots 51. The segmental tongues so formed are bowed as best shown in Figure 4. Rivets 53 secure facing 37' to the axially bowed regions, the other facing 37 having suitable openings opposite the rivets 53 to accommodate the same when being applied. The other facing 37 is secured to plate 27 by similar rivets, in this case the rivets passing through holes in that portion of plate 27 which has not been deflected from its normal plane. The bowed regions flatten into the plane of the plate when the pressure plate moves toward the flywheel, the resilient resistance produced by the flattening of the plate insuring a smooth engagement of the clutch without grabbing.

Driven plate 27 has an inner circular opening whereby it is assembled upon but not secured to a part of hub 29 and is in engagement with a shoulder 55. A circular hub flange 57 lies against the opposite side of shoulder 55 and is fixedly secured to the hub by a plurality of fastening means 59. At its periphery this hub flange 57 has a circular marginal region offset into engagement with the driven plate, this circular offset region being designated by numeral 61. As will be seen in Figures 3 and 4 the fastening means 59 have enlarged flat faced heads 63. A so-called retainer plate 65 is of resilient material and normally of conical shape as shown by Figure 5. Its central opening is mounted for rotatable support on a part 67 of hub 29, this part 67 also supporting the hub flange 57. Adjacent the peripheral part of plate 65, fastening means 69 serve to secure part 65 to the driven plate 27. In the process of so securing together parts 27 and 65, plate 65 is flattened from its unloaded shape shown in Figure 5 to the flat position shown in Figure 3. The fastening means 69 extend through circumferential slots 71 in the hub flange as will be seen by reference to Figure 2. The driven part 27, together with the retainer plate 65 are thus mounted to have rotation relative to the hub and hub flange, the extent of rotation being limited by the dimensions of slots 71. Provision is made to cushion this relative rotation so that the rotation of plate 27 derived from the engine shaft is resiliently transmitted to the hub flange, the hub and the driven shaft. To this end registering openings are formed in the hub flange at 73, in the driven plate at 75 and in the retainer plate at 77. Springs 79 are positioned within these openings and retained by tongues 81 bent from the outer edge of openings 75 of the plate 27 and by tongues 83 similarly formed at the edge of openings 77. Since the springs in each case engage the end walls of the openings in the several plates cushioning torque is provided for both directions of relative rotation. Also during any such relative rotation the pressure between the spring retainer plate and the heads 63 of fastening means 59 for the hub flange and also between the marginal region 61 of the hub flange and the plate 27 is productive of sufficient friction to damp any transmitted vibrations and this is accomplished without the use of any parts additional to those required for the provision of resilient torque transmission. By this very simple expedient for cushioning the driving torque and without the addition of other parts a frictional drag is provided to prevent transmission of vibrations.

I claim:

1. In a clutch, a driven member including a hub having a flange with a peripheral axial offset portion, a driven plate rotatably supported on said hub and frictionally engaging said offset portion, yielding means to transmit torque between said driven plate and said hub flange, together with an axially bowed resilient retainer plate on the side of the flange remote from the driven plate, means whereby said retainer plate and driven plate are made to rotate jointly, said means operable to flatten said retainer plate in assembly whereby said frictional engagement is effected.

2. In a clutch, a driven member including a hub having a flange with a peripheral axial offset portion, a driven plate rotatably supported on said hub and frictionally engaging said offset portion, yielding means to transmit torque between said driven plate and said hub flange, together with projections extending axially from said hub, an axially bowed resilient retainer plate, means whereby said retainer plate and driven plate are made to rotate jointly, said means flattening said retainer plate in assembly whereby said frictional engagement is effected and whereby frictional engagement is also effected between said projections and said retainer plate.

3. In a clutch, a driven member having a hub, a hub flange, means to secure said hub flange to said hub, a driven plate, said hub flange having a peripheral margin bent axially to engage said driven plate, a retainer plate, said plates being rotatably supported on said hub, one on each side of said hub flange and spaced therefrom, said retainer plate being resilient and of conical bowed form, means to connect said driven plate and retainer plate for joint and limited rotation relative to said hub flange, cushioning torque transmitting means between said driven plate and hub flange, said retainer plate being flattened when connected to said driven plate whereby pressure is produced between the peripheral margin of said hub flange and said driven plate to produce friction therebetween in response to relative rotation.

4. In a clutch, a driven member having a hub, a hub flange, means to secure said hub flange to said hub having flattened heads, a driven plate rotatably supported on said hub in axial spaced relation from said hub flange, said hub flange having a peripheral offset region in frictional contact with said driven plate, a retainer plate rotatably supported on said hub in spaced relation to said hub flange and in frictional contact with said heads, means to connect said driven plate and retainer plate for joint rotation relative to said hub flange, and resilient means through which torque is communicated between said driven plate and hub flange.

5. The invention defined by claim 4, said retainer plate being resilient and of conical shape when unloaded whereby it serves to effect said frictional engagements when assembled.

WILLIAM S. WOLFRAM.